(12) United States Patent
Kissner et al.

(10) Patent No.: US 7,292,840 B2
(45) Date of Patent: *Nov. 6, 2007

(54) METHOD FOR ASCERTAINING A BILLING TARIFF FOR A DATA TRANSFER

(75) Inventors: Martin Kissner, Kremmen (DE); Friedrich Koch, München (DE); Hagen Scheibe, Ottobrunn (DE); Jens Schendel, Berlin (DE); Christian Wölkner, Oechsen (DE)

(73) Assignee: Siemens Aktiengesellschaft, Munich (DE)

( * ) Notice: Subject to any disclaimer, the term of this patent is extended or adjusted under 35 U.S.C. 154(b) by 283 days.

This patent is subject to a terminal disclaimer.

(21) Appl. No.: 10/901,433

(22) Filed: Jul. 29, 2004

(65) Prior Publication Data

US 2005/0055292 A1    Mar. 10, 2005

(30) Foreign Application Priority Data

Jul. 31, 2003   (EP)   ................... 03090243

(51) Int. Cl.
*H04Q 7/20* (2006.01)

(52) U.S. Cl. .................. 455/406; 455/411; 455/414.1

(58) Field of Classification Search .......... 455/403, 455/404.2, 405–411, 414.1, 414.2, 461, 432.1, 455/433, 445, 550.1, 450, 560; 370/351, 370/352, 356; 379/114.1, 115.2

See application file for complete search history.

(56) References Cited

U.S. PATENT DOCUMENTS

| 5,905,954 | A |   | 5/1999 | Nguyen |
| 5,978,673 | A | * | 11/1999 | Alperovich et al. ......... 455/417 |
| 6,311,275 | B1 |   | 10/2001 | Jin et al. |

(Continued)

FOREIGN PATENT DOCUMENTS

EP    1 223 737 A1    7/2002

(Continued)

OTHER PUBLICATIONS

ETSI TS 123 078 V4.0.0 (Mar. 2001), no date listed, Digital cellular telecommunications system (Phase 2.) (GSM); Universal Mobile Telecommunications System (UMZS); Customised Applications for Mobile network Enhanced Logic (CAMEL) Phase 3—Stage 2 (3GPP TS 23.078 version 4.0.0 Release 4), especially Chapter 6, p. 272-348.

(Continued)

*Primary Examiner*—Jean Gelin
(74) *Attorney, Agent, or Firm*—Bell, Boyd & Lloyd

(57) ABSTRACT

A method for ascertaining a billing tariff for billing for a packet switched data transfer, where a mobile communication terminal which is involved in the data transfer and has access rights for a data mobile radio network is situated in a visitor mobile radio network. The method involves a data link being set up between a billing system, which performs billing for the data transfer, and a central subscriber register in the data mobile radio network, and this data link being used to transfer to the billing system an item of location information which relates to the current location of the communication terminal. The billing system uses the item of location information to establish that the communication terminal is situated in the visitor mobile radio network, and the billing system ascertains a billing tariff which is associated with the visitor mobile radio network.

17 Claims, 2 Drawing Sheets

U.S. PATENT DOCUMENTS

| | | | |
|---|---|---|---|
| 6,480,485 B1 * | 11/2002 | Kari et al. | 370/352 |
| 6,496,689 B1 * | 12/2002 | Keller et al. | 455/406 |
| 6,496,690 B1 * | 12/2002 | Cobo et al. | 455/408 |
| 6,516,190 B1 * | 2/2003 | Linkola | 455/408 |
| 6,564,063 B1 * | 5/2003 | Mittelstadt | 455/456.1 |
| 6,643,782 B1 | 11/2003 | Jin et al. | |
| 6,920,317 B1 * | 7/2005 | Muhonen | 455/405 |
| 6,975,850 B1 * | 12/2005 | Hurtta et al. | 455/405 |
| 2002/0138635 A1 * | 9/2002 | Redlich et al. | 709/229 |
| 2002/0174212 A1 | 11/2002 | Casati et al. | |
| 2003/0100303 A1 * | 5/2003 | Armbruster et al. | 455/433 |
| 2003/0153298 A1 | 8/2003 | Eder et al. | |
| 2004/0028031 A1 * | 2/2004 | Valin et al. | 370/352 |

FOREIGN PATENT DOCUMENTS

EP         1 331 616 A1      7/2003

OTHER PUBLICATIONS

Digital cellular telecommunications system (Phrase 2+)(GSM); Universal Mobile Telecommunications Systems (UMTS): Customised Applications for Mobile network Enhanced Logic (CAMEL) Phase 3—Stage 2 (3Gpp TS 23.078 version 4.0.0 Release 4) ETS! TS 123078 V4 .0.0, Mar. 31, 2001, XP 002267860, no date listed.

* cited by examiner

METHOD FOR ASCERTAINING A BILLING TARIFF FOR A DATA TRANSFER

CLAIM FOR PRIORITY

This application claims the benefit of priority to European Application No. 03090243.1, filed in the German language on Jul. 31, 2003, the contents of which are hereby incorporated by reference.

TECHNICAL FIELD OF THE INVENTION

The invention relates to a method for ascertaining a billing tariff for billing for a packet switched data transfer, and in particular, to a mobile communication terminal which is involved in the data transfer and has access rights for a data mobile radio network which is situated in a visitor mobile radio network.

BACKGROUND OF THE INVENTION

In telecommunication networks, telecommunication subscribers are provided with a large number of services. Such services involve data transfers taking place between a service provider (for example a service server) and a service user (for example a communication terminal belonging to a telecommunication subscriber). Such data transfers can be used to transfer, by way of example, film data, audio data, message data, market-price data or similar financial information from a service-providing service computer to the service-using communication terminal. In modern communication networks (which are designed on the basis of GPRS or UMTS specifications, for example), the data are transferred in the form of data packets between the service computer and the communication terminal (packet switched data transfer). Mobile communication terminals (e.g. mobile telephones, personal digital assistants or portable computers with a mobile radio interface) can naturally be operated at various locations and hence in various mobile radio networks while using services.

SUMMARY OF THE INVENTION

The invention discloses a method for ascertaining a billing tariff for billing for a data transfer which (method) takes account of the location of the mobile communication terminal.

In one embodiment of the invention, there is a method for ascertaining a billing tariff for billing for a packet switched data transfer, where a mobile communication terminal which is involved in the data transfer and has access rights for a data mobile radio network is situated in a visitor mobile radio network. A data link is set up between a billing system, which performs billing for the data transfer, and a central subscriber registers in the data mobile radio network. This data link is used to transfer an item of location information, relating to the current location of the communication terminal, to the billing system, the billing system uses the item of location information to establish that the communication terminal is situated in the visitor mobile radio network, and the billing system ascertains a billing tariff associated with the visitor mobile radio network. A particular advantage in this context is that the item of location information is transferred from the central subscriber register directly to the billing system using the data link. This allows the item of location information to be transported to the billing system in a simple manner.

In one aspect of the invention, the data link is used to transfer an identifier clearly identifying the mobile communication terminal from the billing system to the central subscriber register, and the central subscriber register then transfers the item of location information to the billing system. An advantage in this context is that the billing system prompts (by transferring the identifier) the central subscriber register to transfer the item of location information. The billing system is thus able to retrieve or request the item of location information from the central subscriber register at precisely determined times.

It is regarded as particularly advantageous if the identifier is transferred from the billing system to the central subscriber register just once at the start of the data transfer, and the billing system stores the subsequently transferred item of location information for the duration of the data transfer. In this case, just one transfer of the identifier and one transfer of the item of location information are required per data transfer.

Alternatively, in another embodiment, a change in the current location of the communication terminal prompts the central subscriber register to transfer the item of location information automatically to the billing system. In this case, the billing system is advantageously provided with the respective up-to-date item of location information without the need for steps for updating the item of location information to be actively taken in the billing system.

In this context, the item of location information is stored in the billing system until the central subscriber register transfers an updated item of location information to the billing system. This ensures that an item of location information is present in the billing system.

In still another embodiment of the invention, setup of a data tunnel, used for transferring the data, from the communication terminal to a network gateway node in the data mobile radio network involves the identifier that clearly identifies the mobile communication terminal being transferred from a switching center, which is temporarily associated with the communication terminal, in the visitor mobile radio network to the network gateway node in the data mobile radio network, and the identifier is transferred from this network gateway node to the billing system. As a result, the identifier can be transferred to the billing system when the data transfer actually starts.

In yet another embodiment of the invention, the method is initiated by the visitor mobile radio network receiving a request message from the communication terminal which relates to the data transfer, a request is sent from the visitor mobile radio network to the central data store regarding that data mobile radio network for which the communication terminal has access rights, and the data tunnel is then set up to the network gateway node in this data mobile radio network. In this case, the visitor mobile radio network advantageously ascertains that data mobile radio network for which the communication terminal has access rights and that data mobile radio network which can therefore be used to implement the data transfer. Such a data mobile radio network for which the communication terminal has access rights may be, by way of example, the communication terminal's home network or else a mobile radio network between whose operator and a user of the communication terminal an appropriate agreement has been made.

The method may proceed in a manner such that the network gateway node transfers the identifier to an authentication server in the data mobile radio network using an authentication message, and the authentication message is taken as a basis for transferring the identifier to a service computer gateway. In this case, it is advantageous that the identifier is transferred using an authentication message which is often transferred between network gateway nodes and authentication servers anyway in data mobile radio networks. This means that no additional message is necessary for transferring the identifier.

The invention allows the authentication message to be taken as a basis for transferring the identifier to the service computer gateway in that the network gateway node transferring the identifier to the authentication server via the service computer gateway, the transfer involving the service computer gateway reading the identifier from the authentication message, and the identifier being stored in the service computer gateway. In this embodiment, the authentication server is advantageously not burdened by additional tasks for processing the identifier, since the service computer gateway automatically reads the identifier from the authentication message and stores it.

In another embodiment of the invention, the service computer gateway monitors the data transfer, and monitoring information ascertained by the service computer gateway and the identifier are transferred to the billing system. In this case, the billing system is provided with the information which can be used for billing by the service computer gateway.

In another aspect of the invention, the network gateway node is able to receive a user name and/or a password from the communication terminal, and then allows the authentication message to be transferred to an authentication server, with the authentication message including the user name and/or the password. In this case, it is advantageously possible for authentication of the data transfer (which authentication may be necessary in the data mobile radio network anyway) to be connected to transfer of the identifier.

Alternatively, the network gateway node receives from the communication terminal a user name which serves merely as a dummy and/or a password which serves merely as a dummy. This embodiment allows the identifier to be transferred to the service computer gateway using the authentication message even when no authentication for the data transfer is required. The use of a user name and/or password which serves merely as a dummy allows the network gateway node to create and transfer an authentication message which is complete in form.

The invention allows the data mobile radio network used to be the home mobile radio network of the communication terminal.

The inventive method allows the billing system to compare the item of location information with stored location information associated with various visitor mobile radio networks, and a match between the item of location information and one of the stored items of location information allows the billing system to establish that the communication terminal is situated in the associated visitor mobile radio network. In this context, a simple comparison between the item of location information and the stored location information makes it possible to ascertain the visitor mobile radio network in which the mobile communication terminal is currently situated.

In line with the invention, the method allows the item of location information transferred to the network gateway node to be a visitor location register address, with the visitor location register address clearly identifying a visitor location register, which is temporarily associated with the communication terminal, in the visitor mobile radio network. In this context, an item of information (visitor location register address) which is present in the central subscriber register anyway is advantageously used as the item of location information, which results in a method which is particularly easy to implement.

In still another embodiment of the invention, the switching center which is temporarily associated with the communication terminal transfers a parameter for the data transfer to the billing system, and this parameter is used when ascertaining the billing tariff. This advantageously makes it possible to use various billing tariffs which are associated with the data transfer using quantitative features (parameters).

The parameter for the data transfer which is transferred to the billing system may be a bandwidth parameter for the air interface of the communication terminal.

The billing system used may be a service control point in an intelligent network.

The invention allows the data link to be used to transfer to the billing system the item of location information which relates to the current location of the communication terminal using the message AnyTimeInterrogationResult.

In yet another embodiment of the invention, the data link is used to transfer the identifier clearly identifying the mobile communication terminal from the billing system to the central subscriber register using the message AnyTimeInterrogation. An advantage of the two latter embodiments is that transfer of the item of location information and transfer of the identifier involve the use of messages which permit the invention to be used with central subscriber registers which already exist in existing telecommunication networks. This means that the method can also be used in already existing telephone networks quickly and with little involvement.

BRIEF DESCRIPTION OF THE DRAWINGS

The invention is explained below in further detail with reference to the drawings, in which.

DETAILED DESCRIPTION OF THE INVENTION

Figure 1:
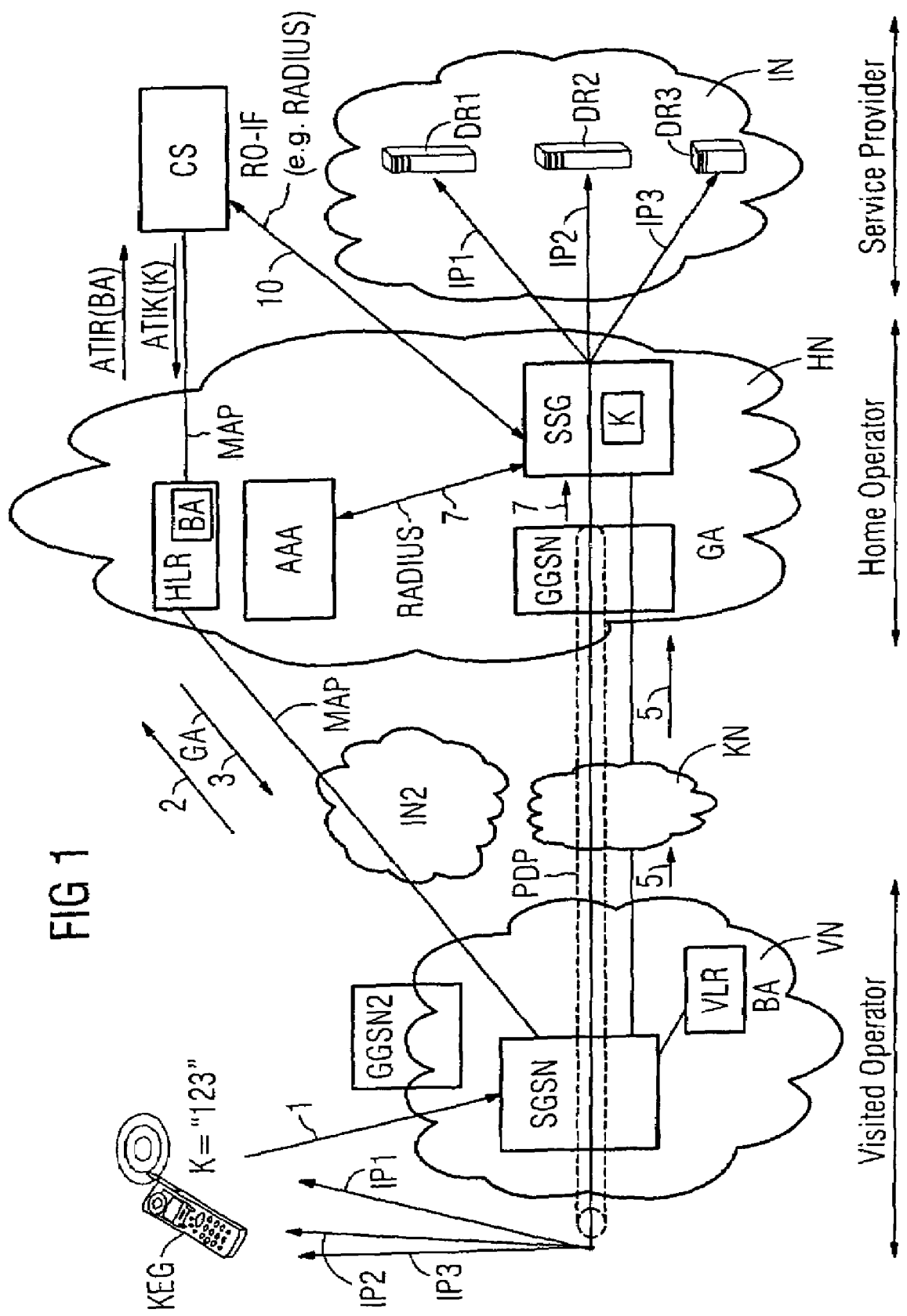
FIG. 1 shows an exemplary embodiment of telecommunication networks involved in a data transfer in accordance with the invention.

FIG. 1 shows a mobile telecommunication terminal KEG in the form of a mobile telephone with the mobile radio telephone number "123", the mobile radio telephone number "123" representing an identifier K which clearly identifies the mobile communication terminal KEG. The communication terminal KEG is currently situated in the radio area of a visitor mobile radio network VN and is connected thereto. The visitor mobile radio network VN is subject to the control of a visitor network operator ("visited operator"). The communication terminal KEG is intended to be used to make use of a service on a service computer DR2, the service computer DR2 being arranged on the Internet IN. The service computer DR2 is subject to the control of a service provider. The communication terminal KEG accesses the service computer DR2 on the Internet IN using the visitor mobile radio network VN, using a further telecommunication network KN and using a data mobile radio network HN. The data mobile radio network HN is, in general terms, a mobile radio network for which the communication terminal KEG has access rights and which is therefore used to effect the service use or the access to the data on the service computer DR2.

This service use involves data packets IP2 being interchanged between the communication terminal KEG and the service computer DR2. The transfer of such IP data packets designed on the basis of the Internet Protocol (IP) (packet switched data transfer) implements bidirectional data transfer between the communication terminal KEG and the data mobile radio network HN or the service computer DR2.

The communication terminal KEG may also simultaneously use a further service on a further service computer DR1 and/or a third service on a third service computer DR3. To this end, data packets IP1 are interchanged bidirectionally between the communication terminal KEG and the further service computer DR1. Similarly, data packets IP3 are interchanged bidirectionally between the communication terminal KEG and the third service computer DR3.

Services which the mobile communication terminal accesses by transferring data in data packets are also referred to as "IP services". Such services are provided for the user of the communication terminal KEG by his home mobile radio network HN (mobile network operators core network). In the exemplary embodiment, this is done by virtue of the home network HN conveying access to the service computer DR2 on the Internet. In the exemplary embodiment, the data mobile radio network HN as the home mobile radio network is subject to the control of a home network operator ("home operator"). In another exemplary embodiment, the service computer DR2 may also be arranged within the home network HN.

In another exemplary embodiment, the case may also arise that a user of the communication terminal KEG and a network operator in a third mobile radio network (which differs from the home mobile radio network of this communication terminal KEG) sign an agreement allowing the communication terminal KEG to access this third mobile radio network in order to use services via the third mobile radio network. In this case, "APN (Access Point Name) settings" in the communication terminal KEG are altered such that the communication terminal KEG is able to access a network gateway node in this third mobile radio network. In this case, this third mobile radio network behaves in a similar manner to the home network of the communication terminal in terms of service use; this is because the third mobile radio network allows the communication terminal KEG to transfer data using the respective service computer.

The mobile radio network which the roaming mobile radio subscriber KEG is able to access and for which he has access rights is referred to within the context of this description as the data mobile radio network HN. This data mobile radio network may thus be either the home mobile radio network of the communication terminal or a third mobile radio network which the communication terminal is able to access for the purpose of service use.

Connected to the data mobile radio network HN is a billing system CS which is used to bill for the data transfer. This means that a user of the communication terminal KEG can be invoiced for this data transfer. For this purpose, the billing system CS holds various billing tariffs which can be applied in line with the type of the respective data transfer. The billing system CS stores, by way of example, a billing tariff which can be applied when the mobile communication terminal KEG is situated in the sphere of influence of the visitor mobile radio network VN (i.e. "is roaming" therein). For further visitor mobile radio networks (into whose sphere of influence the mobile communication terminal might likewise enter and from where the communication terminal might likewise set up data transfers to the data mobile radio network), which are not shown in the figure, the billing system CS likewise stores associated billing tariffs. By way of example, such billing tariffs contain price data to be applied to the respective data transfer (e.g. one minute of data transfer costs Euro 0.30, 10 Kbyte of transferred data volume costs Euro 1, a data record transferred entirely using data packets costs Euro 3).

In the exemplary embodiment, the billing system used is a service control point (SCP); the data mobile radio network HN has the structure of an intelligent network.

The text below explains how the billing tariff currently to be applied is ascertained in the billing system CS. If, for the purpose of service use, the mobile communication terminal KEG is used to access the service computer DR2 and a corresponding data transfer is to be implemented between the communication terminal and the service computer DR2, then the communication terminal KEG sends a request message relating to the data transfer to the visitor mobile radio network VN (arrow 1). This request message is sent to a switching center SGSN (Serving GPRS Support Node) in the visitor mobile radio network VN. This switching center has an associated visitor location register VLR. Often, the visitor location register and the switching center are provided in one unit. The switching center SGSN then asks a central data store in the form of a home location register HLR for which data mobile radio network the communication terminal KEG has access rights (arrow 2). In the exemplary embodiment, this request is made via a further Internet IN2 using MAP messages. The home location register HLR stores such information for each subscriber in the form of a data record "GPRS Subscription Data" (in GPRS or UMTS mobile radio networks, the central data store used may also be a storage node HSS). The home location register HLR uses the MAP message "Insert Subscriber" to transfer a gateway address GA for a network gateway node GGSN in the data mobile radio network HN to the switching center SGSN (arrow 3). A data tunnel PDP in the form of a "PDP (Packet Data Protocol) context" is then set up to implement the data transfer between the communication terminal and the network gateway node GGSN in the data mobile radio network. While the data tunnel PDP is being set up, the mobile communication terminal sends a user name and/or a password to the network gateway node GGSN. This user name and/or password may be a user name and/or a password which is provided for the purpose of authenticating the data transfer. Alternatively, it may also be a user name and/or password which serves merely as a dummy and whose content is arbitrary and has no significance whatsoever. In this case, a user name and/or password in such a form is advantageously used to provide the network gateway node GGSN with the option of creating an authentication message even when authentication is not actually required taking into account security aspects.

Setup of the data tunnel PDP likewise involves the identifier K, which clearly identifies the mobile communication terminal KEG, in the form of the mobile telephone number "123" being transferred to the network gateway node GGSN. Instead of the mobile telephone number (MSISDN=Mobile Station ISDN number), other character strings which can be clearly associated with the communication terminal KEG or its current user may also be used as the identifier K, e.g. the international mobile subscriber identity IMSI. The transfer of the identifier K and of the user name and/or of the password is symbolized by the arrows 5. In the exemplary embodiment, these data are transferred to the network gateway node GGSN via the further telecommunication network KN. The further telecommunication network KN is an "inter-PLMN backbone" in the exemplary embodiment.

When the network gateway node GGSN has received the user name, the password and the identifier, the network gateway node GGSN creates an authentication message which contains the user name, the password and the identifier K. This authentication message is transferred from the network gateway node GGSN to an authentication server AAA via a service computer gateway SSG. As an authentication message of this type, an "Access Request" message designed on the basis of the RADIUS protocol is used (arrow 7). The service computer gateway SSG is that network node in the data mobile radio network HN which can set up a connection to the service computer which provides the respective service (in the exemplary embodiment, to the service computer DR2 on the Internet).

The service computer gateway SSG reads the identifier K from the authentication message 7 and buffer-stores it for the duration of the data transfer. (In one alternative embodiment, the identifier K is transferred to the authentication server AAA using the authentication message, is read from the authentication message by this authentication server AAA and is then transmitted from the authentication server AAA to the service computer gateway SSG. The identifier K is then buffer-stored by the service computer gateway SSG.)

The service computer gateway SSG now monitors the data transfer between the communication terminal KEG and the service computer DR2; by way of example, the service computer gateway SSG ascertains the number and/or the data volume of the data packets which are interchanged between the communication terminal KEG and the service computer DR2. The service computer gateway SSG sends the information ascertained in this way to the billing system CS as monitoring information together with the stored identifier K. Such monitoring information may be transferred, by way of example, using billing messages "Accounting Start" and "Accounting Stop" designed on the basis of the RADIUS protocol (arrow 10). These messages are transferred from the service computer gateway SSG to the billing system CS at the start and at the end of the data transfer for which billing is to be performed. In this case, the data transfer between the service computer gateway SSG and the billing system CS takes place via the inherently known "RO interface" RO-IF; in this way, billing for the data transfers in the current "session" is prepared.

Next, a data link is set up between the billing system CS and the central subscriber register HLR in the data mobile radio network HN. A message ATI (AnyTimeInterrogation) designed on the basis of the data transfer protocol MAP is used to transfer the identifier K from the billing system CS to the central subscriber register HLR via this data link.

The central subscriber register HLR stores location information about the mobile communication terminal KEG to an extent which is known. In the event of the location of the mobile communication terminal KEG changing, this location information is updated (location update). As such an item of location information, the home location register HLR stores a visitor location register address BA which clearly identifies the visitor location register VLR in whose sphere of influence the communication terminal KEG is currently situated. This visitor location register address BA thus represents an item of location information for the communication terminal KEG, because the mobile communication terminal KEG is currently situated in the local sphere of influence of this visitor location register VLR; the visitor location register VLR is the visitor mobile radio network's visitor location register temporarily associated with the communication terminal. Such visitor location registers are often provided together with switching centers in one unit.

The central subscriber register HLR ascertains the visitor location register address BA of the mobile communication terminal using the identifier K. This item of location information in the form of the visitor location register address BA is then transferred to the billing system CS via the data link using the MAP message ATIR (AnyTimeInterrogationResponse). However, the location information transferred from the home location register HLR to the billing system CS via the data link may also be other information, e.g. a country code for the country in which the communication terminal KEG is currently situated or an identity (Cell ID) for the radio cell in the visitor mobile radio network VN in whose radio coverage area the communication terminal KEG is currently situated. This information may be requested from the visitor location register VLR by the subscriber register HLR, for example using the MAP message "Provide Subscriber Information".

The billing system CS now uses the item of location information BA to establish that the communication terminal KEG is situated in the visitor mobile radio network VN. To this end, the billing system compares the item of location information BA with stored items of location information associated with various visitor mobile radio networks. In the exemplary embodiment, the billing system CS stores that the visitor location register address BA is associated with the visitor mobile radio network VN. From this stored item of location information, the billing system CS identifies that the communication terminal KEG is situated in the sphere of influence of the visitor mobile radio network VN. Next, the billing system CS ascertains the billing tariff associated with the visitor mobile radio network VN and uses it for subsequently billing for the data transfer. This billing tariff may, by way of example, have higher billing charges than a billing tariff which would be applied if the communication terminal KEG were situated in the radio coverage area of the data mobile radio network HN or were connected directly thereto (i.e. if the communication terminal KEG is not "roaming", but rather is situated in the sphere of influence of its home network, for example).

Whenever a billing message 10 is sent, the service computer gateway SSG inserts the identifier K into the billing message, so that the billing system CS can request updated location information BA from the home location register HLR whenever a billing message 10 has been received. In one particularly advantageous embodiment, the identifier is transferred from the billing system CS to the central subscriber register HLR just once at the start of the data transfer, however. The item of location information BA which is then transferred from the home location register to the billing system is stored in the billing system for the duration of the data transfer and is used to ascertain the billing tariff. The effect advantageously achieved by this is that transferring the item of location information to the billing system results in slight additional network loading.

In one alternative embodiment of the method, the central subscriber register HLR automatically transfers the up-to-date item of location information to the billing system whenever the current location of the communication terminal KEG changes (which is connected to a change in the subscriber data stored in the subscriber register HLR); this is a "push method". This transfer of the item of location information via the data link may be effected in the inventive method using the MAP message "Mobility Management Event Notification", for example. The item of location information is stored in the billing system CS, and is used to ascertain the billing tariff, until the central subscriber register HLR transfers an updated item of location information BA to the billing system CS.

Alternatively, the switching center SGSN temporarily associated with the communication terminal can additionally transfer a parameter for the data transfer to the data mobile radio network HN and to the billing system CS besides the identifier K when the data tunnel PDP is set up. As a parameter of this type, it is possible to transfer, by way of example, an item of information about the bandwidth of the air interface of the mobile telephone KEG. This is particularly advantageous in UMTS mobile radio networks, since in these networks various data transfer rates (bandwidths) are used depending on the direction of the data transferred. This additional parameter for the data transfer can also be used by the billing system CS when ascertaining the billing tariff.

In another alternative embodiment of the method, the service computer gateway SSG can produce "charging tickets", which are then transferred to a billing system in the form of a postpaid system. When producing these tickets, the service computer gateway SSG uses a billing tariff. The item of location information required for ascertaining the billing tariff can be obtained from the central subscriber register HLR by the service computer gateway SSG in a manner which is similar to the manner in which the billing system CS obtained the item of location information from the central subscriber register HLR in the method described above.

Figure 2:
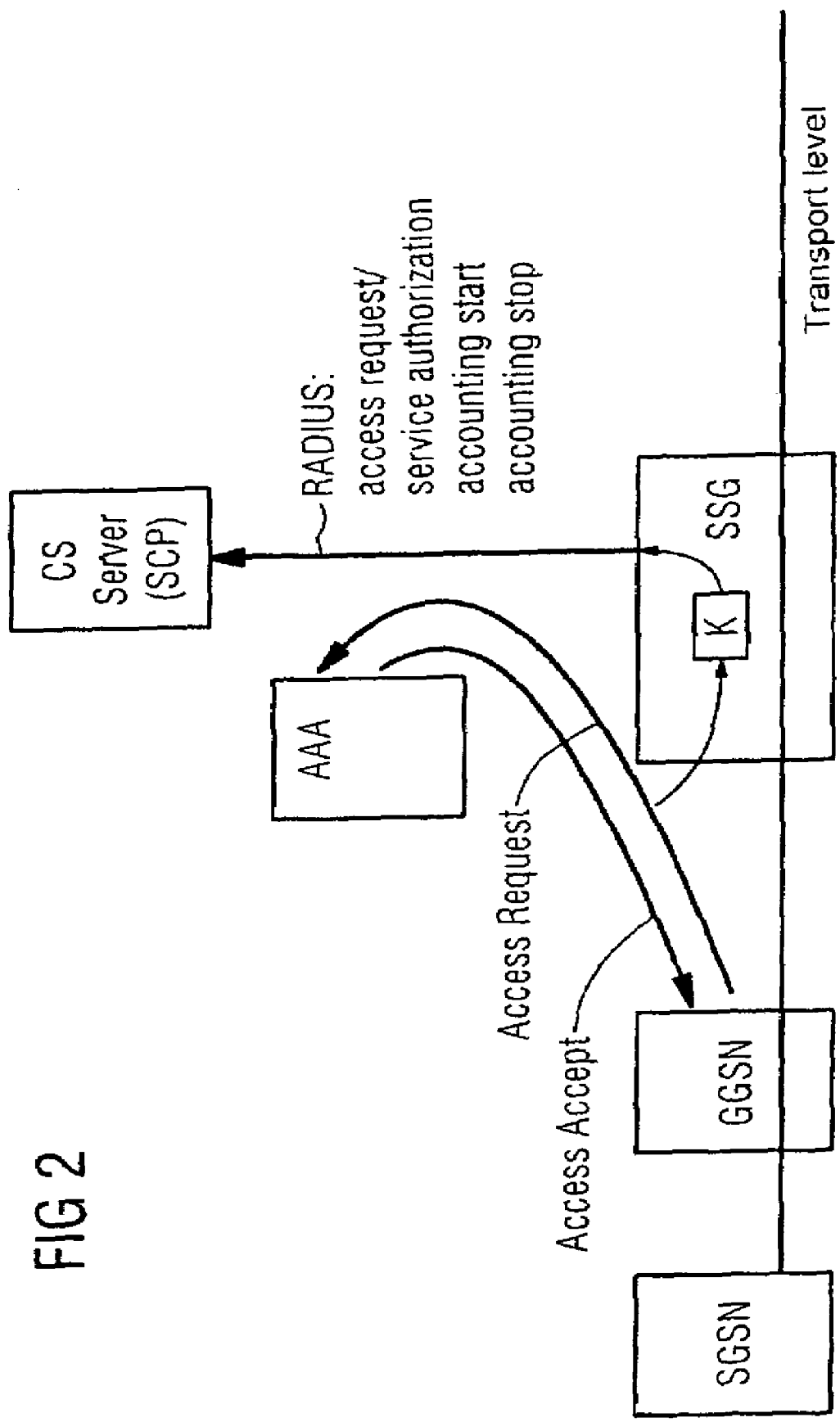
FIG. 2 shows an exemplary embodiment of message transfers between a network gateway node and an authentication server.

FIG. 2 clearly shows how the network gateway node GGSN uses the authentication message "Access Request" to transfer the identifier K to the authentication server AAA. The service computer gateway SSG reads the identifier K from the authentication message and buffer-stores it so as to transmit it later to the billing system CS together with the monitoring information as part of the "Access Request" and "Service Authorization" actions performed on the basis of RADIUS specifications. The authentication server AAA responds to the authentication message "AAA Request" with the message "Access Accept".

The method described can be used to ascertain a billing tariff for billing for an IP packet oriented or packet switched data transfer taking into account whether the mobile communication terminal is situated (roaming) in a visitor mobile radio network.

This method advantageously involves the use of no functionalities of the CAMEL3 standard whatsoever. This is a considerable advantage, since many network operators currently do not provide or use the functionalities of CAMEL3 in their mobile radio networks for reasons of cost and involvement. With the solution described, the fact that a mobile communication terminal is situated in a visitor mobile radio network when using packet based services can also be identified for mobile radio networks which do not have CAMEL functionality. A billing tariff associated with this visitor mobile radio network for billing for service use or the associated data transfer can be ascertained. The billing tariff can be ascertained in this way in real time, so that the subsequent billing can also be performed using prepaid credits (prepaid methods), for example. In this context, the method described can advantageously be carried out by transferring messages designed on the basis of RADIUS specifications.

Abbreviations used:

| | |
|---|---|
| CAMEL | Customised Applications for Mobile network Enhanced Logic |
| GGSN | Gateway GPRS Support Node |
| GPRS | General Packet Radio Service |
| HLR | Home Location Register |
| HSS | Home Subscriber Server |
| MAP | Mobile Application Part |
| PLMN | Public Land Mobile Network |
| PDP | Packet Data Protocol, e.g. IP protocol |
| SGSN | Serving GPRS Support Node |
| SSG | Service Selection Gateway |
| UMTS | Universal Mobile Telecommunication System. |

What is claimed is:

1. A method for ascertaining a billing tariff for billing for a packet switched data transfer, where a mobile communication terminal which is involved in the data transfer and has access rights for a data mobile radio network is situated in a visitor mobile radio network, comprising:

setting up a data link between a billing system, which performs billing for the data transfer, and a central subscriber register in the data mobile radio network;

using the data link to transfer an item of location information, relating to the current location of the communication terminal, to the billing system;

establishing, using the item of location information, that the communication terminal is situated in the visitor mobile radio network; and determining a billing tariff associated with the visitor mobile radio network, wherein the data link is used to transfer an identifier identifying the mobile communication terminal from the billing system to the central subscriber register, and the central subscriber register transfers the item of location information to the billing system, setup of a data tunnel, used for transferring the data, from the communication terminal to a network gateway node in the data mobile radio network involves the identifier being transferred from a switching center, which is temporarily associated with the communication terminal, in the visitor mobile radio network to the network gateway node in the data mobile radio network, the identifier is transferred from the network gateway node to the billing system, the network gateway node transfers the identifier to an authentication server in the data mobile radio network using an authentication message, and the authentication message is taken as a basis for transferring the identifier to a service computer gateway.

2. The method as claimed in claim 1, wherein the identifier is transferred from the billing system to the central subscriber register at the start of the data transfer, and the billing system stores the subsequently transferred item of location information for the duration of the data transfer.

3. The method as claimed in claim 1, wherein a change in the current location of the communication terminal prompts the central subscriber register to transfer the item of location information automatically to the billing system.

4. The method as claimed in claim 3, wherein the item of location information is stored in the billing system until the central subscriber register transfers an updated item of location information to the billing system.

5. The method as claimed in claim 1, wherein
the method is initiated by the visitor mobile radio network receiving a request message from the communication terminal which relates to the data transfer,
a request is sent from the visitor mobile radio network to the central data store regarding that data mobile radio network for which the communication terminal has access rights, and
the data tunnel is set up to the network gateway node in the data mobile radio network.

6. The method as claimed in claim 1, wherein
the network gateway node transfers the identifier to the authentication server via the service computer gateway,
the transfer involves the service computer gateway reading the identifier from the authentication message, and
the identifier is stored in the service computer gateway.

7. The method as claimed in claim 1, wherein
the service computer gateway monitors the data transfer, and
monitoring information ascertained by the service computer gateway and the identifier are transferred to the billing system.

8. The method as claimed in claim 1, wherein
the network gateway node receives a user name and/or a password from the communication terminal, and
the authentication message is transferred to the authentication server, the authentication message including the user name and/or the password.

9. The method as claimed in claim 8, wherein the network gateway node receives from the communication terminal a user name which serves as a dummy and/or a password which serves as a dummy.

10. The method as claimed in claim 1, wherein the data mobile radio network used is the home mobile radio network of the communication terminal.

11. The method as claimed in claim 1, wherein
the billing system compares the item of location information with stored location information associated with various visitor mobile radio networks, and
a match between the item of location information and one of the stored items of location information prompts the billing system to establish that the communication terminal is situated in the associated visitor mobile radio network.

12. The method as claimed in claim 1, wherein the item of location information transferred to the network gateway node is a visitor location register address, with the visitor location register address identifying a visitor location register, which is temporarily associated with the communication terminal, in the visitor mobile radio network.

13. The method as claimed in claim 1, wherein a switching center which is temporarily associated with the communication terminal additionally transfers a parameter for the data transfer to the billing system, and the parameter is used when ascertaining the billing tariff.

14. The method as claimed in claim 13, wherein the parameter for the data transfer which is transferred to the billing system is a bandwidth parameter for the air interface of the communication terminal.

15. The method as claimed in claim 1, wherein the billing system used is a service control point in an intelligent network.

16. The method as claimed in claim 1, wherein the data link is used to transfer to the billing system the item of location information which relates to the current location of the communication terminal using the message AnyTimeInterrogationResult.

17. The method as claimed in claim 1, wherein the data link is used to transfer the identifier from the billing system to the central subscriber register using the message AnyTimeInterrogation.

* * * * *